(12) United States Patent
Watanabe et al.

(10) Patent No.: US 12,607,798 B2
(45) Date of Patent: **\*Apr. 21, 2026**

(54) OPTICAL FIBER

(71) Applicant: SUMITOMO ELECTRIC INDUSTRIES, LTD., Osaka (JP)

(72) Inventors: Yudai Watanabe, Osaka (JP); Kazuyuki Sohma, Osaka (JP); Iwao Okazaki, Osaka (JP); Takahiro Nomura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 87 days.

This patent is subject to a terminal disclaimer.

(21) Appl. No.: 18/426,451

(22) Filed: Jan. 30, 2024

(65) Prior Publication Data

US 2024/0264365 A1      Aug. 8, 2024

(30) Foreign Application Priority Data

Feb. 3, 2023      (JP) ................................. 2023-015437

(51) Int. Cl.
*G02B 6/02*           (2006.01)

(52) U.S. Cl.
CPC ..... *G02B 6/02395* (2013.01); *G02B 6/02004* (2013.01)

(58) Field of Classification Search
None
See application file for complete search history.

(56) References Cited

U.S. PATENT DOCUMENTS

| | | | |
|---|---|---|---|
| 11,181,685 B2 | 11/2021 | Abedijaberi et al. | |
| 11,181,687 B2 | 11/2021 | Bennett et al. | |
| 2004/0227952 A1* | 11/2004 | Jasapara | C03B 37/0253 |
| | | | 356/479 |
| 2018/0128970 A1* | 5/2018 | Homma | C08G 18/4825 |
| 2020/0257043 A1 | 8/2020 | Kohda | |

(Continued)

FOREIGN PATENT DOCUMENTS

| | | | | |
|---|---|---|---|---|
| CN | 102844694 B | * | 8/2016 | ........... G02B 6/4482 |
| EP | 3988590 A1 | | 4/2022 | |

(Continued)

OTHER PUBLICATIONS

US Notice of Allowance issued in U.S. Appl. No. 18/532,022 dated Jan. 15, 2026.

(Continued)

*Primary Examiner* — Chris H Chu

(74) *Attorney, Agent, or Firm* — McDonald Hopkins LLC

(57)           ABSTRACT

The optical fiber includes a glass fiber and a coating resin layer. The coating resin layer includes a primary resin layer and a secondary resin layer. The glass fiber has an outer diameter of from 79 µm to 81 µm. The secondary resin layer has an outer diameter of from 120 µm to 170 µm. The primary resin layer has an in situ elastic modulus of from 0.1 MPa to 0.4 MPa. The secondary resin layer has an in situ elastic modulus of from 1200 MPa to 2800 MPa. A maximum value of amplitude of an amount of eccentricity is 10 µm or less in a spectrum obtained by measuring the amount of eccentricity of the glass fiber and by applying Fourier transform to a waveform representing the amount of eccentricity.

13 Claims, 9 Drawing Sheets

(56)     References Cited

U.S. PATENT DOCUMENTS

| | | | |
|---|---|---|---|
| 2021/0041623 A1 | 2/2021 | Li et al. | |
| 2021/0223469 A1* | 7/2021 | Bickham | G02B 6/0281 |
| 2021/0356657 A1 | 11/2021 | Mukasa | |
| 2021/0364692 A1 | 11/2021 | Mukasa | |

FOREIGN PATENT DOCUMENTS

| | | | | |
|---|---|---|---|---|
| EP | 4141500 A2 | | 3/2023 | |
| JP | 2001013332 A | * | 1/2001 | |
| JP | 2001-183558 A | | 7/2001 | |
| JP | 2014066558 A | * | 4/2014 | |
| JP | 2020-129037 A | | 8/2020 | |
| WO | 96/31444 A1 | | 10/1996 | |
| WO | 2010/053356 A2 | | 5/2010 | |
| WO | 2017/172714 A1 | | 10/2017 | |
| WO | 2019/212796 A1 | | 11/2019 | |
| WO | WO-2020045372 A1 * | | 3/2020 | G02B 6/4403 |
| WO | 2020/162406 A1 | | 8/2020 | |
| WO | 2022/020416 A1 | | 1/2022 | |
| WO | 2023/032999 A1 | | 3/2023 | |

OTHER PUBLICATIONS

US Notice of Allowance issued in U.S. Appl. No. 18/425,301 dated Jan. 23, 2026.

* cited by examiner

OPTICAL FIBER

TECHNICAL FIELD

The present disclosure relates to an optical fiber. This application claims priority based on Japanese Patent Application No. 2023-015437 filed on Feb. 3, 2023, the entire contents of which are incorporated herein by reference.

BACKGROUND

WO 2010/053356 A2, US 2021/0041623 A1 and WO 2017/172714 A1 disclose an optical fiber the outer diameter of which is 210 μm or less.

JP 2020-129037 A discloses an optical fiber having a trench layer.

WO 2020/162406 A1, U.S. Ser. No. 11/181,685 B2 and U.S. Ser. No. 11/181,687 B2 disclose an optical fiber the glass diameter of which is less than 125 μm.

SUMMARY

The optical fiber according to one aspect of the present disclosure includes: a glass fiber including a core and a cladding; and a coating resin layer coating an outer periphery of the glass fiber. The coating resin layer includes a primary resin layer coating the outer periphery of the glass fiber, and a secondary resin layer coating an outer periphery of the primary resin layer. The glass fiber has an outer diameter of from 79 μm to 81 μm. The primary resin layer has a thickness of 5 μm or more. The secondary resin layer has a thickness of 5 μm or more. The secondary resin layer has an outer diameter of from 120 μm to 170 μm. The primary resin layer has an in situ elastic modulus of from 0.1 MPa to 0.4 MPa. The secondary resin layer has an in situ elastic modulus of from 1200 MPa to 2800 MPa. A maximum value of amplitude of an amount of eccentricity is 10 μm or less in a spectrum obtained by measuring, at a plurality of measurement points set at predetermined intervals in an axial direction of the glass fiber, the amount of eccentricity of the glass fiber from a central axis relative to the outer periphery of the secondary resin layer, and by applying Fourier transform to a waveform representing the amount of eccentricity at each position of the plurality of measurement points.

DETAILED DESCRIPTION

Figure 1:
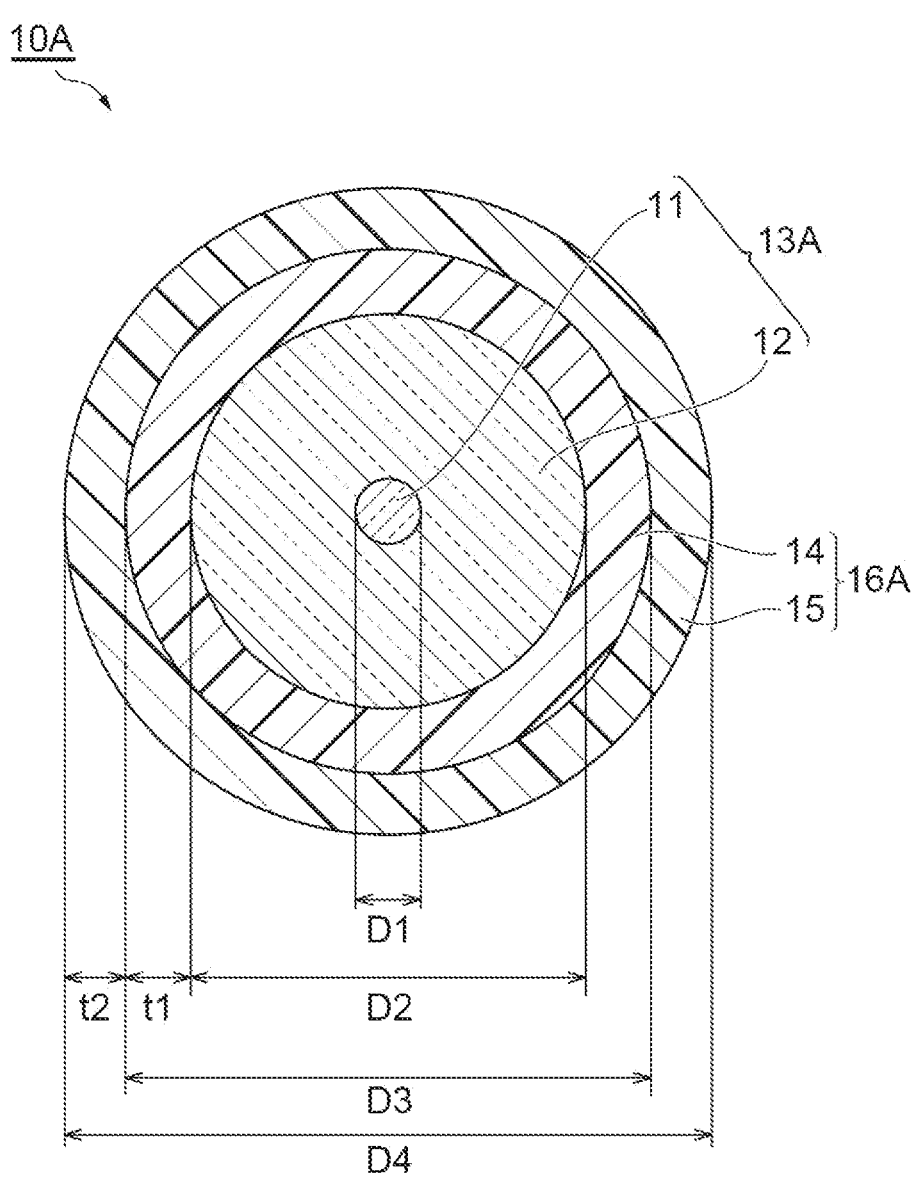
FIG. 1 is a diagram illustrating a cross-section perpendicular to an axial direction of an optical fiber according to a first embodiment.

Problems to be Solved by the Present Disclosure

Reducing the diameter of a typical optical fiber (125 μm±1 μm) while maintaining the outer diameter of the glass fiber causes the coating resin layer to be thin. As the coating resin layer becomes thinner, the transmission loss (microbending loss) caused by minute bending that occurs when a lateral pressure is applied to the optical fiber tends to increase. That is, the lateral pressure resistance characteristics of the optical fiber deteriorate. The deterioration of the lateral pressure resistance characteristics can be suppressed to a certain extent by reducing the Young's modulus of the primary resin layer. However, reducing the Young's modulus of the primary resin layer too much will cause the deterioration of low-temperature characteristics (when the optical fiber is left to stand at a low temperature of −40° C., the transmission loss increment of light having a wavelength of 1550 nm at room temperature is over +0.5 dB/km).

It is an object of the present disclosure to provide an optical fiber of which the diameter can be reduced while deterioration of low-temperature characteristics and lateral pressure resistance characteristics can be suppressed.

DESCRIPTION OF EMBODIMENTS OF THE PRESENT DISCLOSURE

Embodiments of the present disclosure will first be listed and described.

(1) A first optical fiber according to one aspect of the present disclosure includes: a glass fiber including a core and a cladding; and a coating resin layer coating an outer periphery of the glass fiber, wherein the coating resin layer includes: a primary resin layer coating the outer periphery of the glass fiber; and a secondary resin layer coating an outer periphery of the primary resin layer, the glass fiber has an outer diameter of from 79 μm to 81 μm, the primary resin layer has a thickness of 5 μm or more, the secondary resin layer has a thickness of 5 μm or more, the secondary resin layer has an outer diameter of from 120 μm to 170 μm, the primary resin layer has an in situ elastic modulus of from 0.1 MPa to 0.4 MPa, the secondary resin layer has an in situ elastic modulus of from 1200 MPa to 2800 MPa, and a maximum value of amplitude of an amount of eccentricity is 10 μm or less in a spectrum obtained by measuring, at a plurality of measurement points set at predetermined intervals in an axial direction of the glass fiber, the amount of eccentricity of the glass fiber from a central axis relative to the outer periphery of the secondary resin layer, and by applying Fourier transform to a waveform representing the amount of eccentricity at each position of the plurality of measurement points.

According to experiments, an optical fiber having such parameters enables the diameter to be reduced while suppressing the deterioration of the low-temperature characteristics and the lateral pressure resistance characteristics.

(2) In (1) above, the secondary resin layer may be a colored layer including a pigment or a dye. In this case, the optical fiber can be distinguished by color.

(3) In (1) or (2) above, the primary resin layer may have an in situ elastic modulus of from 0.1 MPa to 0.3 MPa. In this case, the lateral pressure resistance characteristics can be particularly improved.

(4) The first optical fiber according to one aspect of the present disclosure includes a glass fiber including a core and a cladding, and a coating resin layer coating an outer periphery of the glass fiber. The coating resin layer includes a primary resin layer coating the outer periphery of the glass fiber, a secondary resin layer coating an outer periphery of the primary resin layer, and a coating layer coating an outer periphery of the secondary resin layer. The glass fiber has an outer diameter of from 79 μm to 81 μm. The secondary resin layer has an outer diameter of from 120 μm to 160 μm. The coating layer has an outer diameter of from 130 μm to 170 μm. The primary resin layer has a thickness of 5 μm or more. The secondary resin layer has a thickness of 5 μm or more. The primary resin layer has an in situ elastic modulus of from 0.1 MPa to 0.5 MPa. The secondary resin layer has an in situ elastic modulus of from 1200 MPa to 2800 MPa. A maximum value of amplitude of an amount of eccentricity is 10 μm or less in a spectrum obtained by measuring, at a plurality of measurement points set at predetermined intervals in an axial direction of the glass fiber, the amount of eccentricity of the glass fiber from a central axis relative to the outer periphery of the secondary resin layer, and by applying Fourier transform to a waveform representing the amount of eccentricity at each position of the plurality of measurement points.

According to experiments, an optical fiber having such parameters enables the diameter to be reduced while suppressing the deterioration of the low-temperature characteristics and the lateral pressure resistance characteristics.

(5) In (4) above, the coating layer may be a colored resin layer including a pigment or a dye. In this case, ultraviolet radiation tends to reach deep into the coating layer, so that the coating layer can be sufficiently cured.

(6) In (4) above, the secondary resin layer may be a colored resin layer including a pigment or a dye, and the coating layer may be a transparent resin layer. In this case, the optical fiber can be distinguished by color.

(7) In any one of (4) to (6) above, the coating layer may include a mold release agent. In this case, tape material used for forming into a tape can be easily peeled off.

(8) In any one of (4) to (7) above, the coating resin layer may further have a ring mark disposed between the secondary resin layer and the coating layer. In this case, the number of distinguishable colors can be increased.

(9) In any one of (4) to (8) above, the primary resin layer may have an in situ elastic modulus of from 0.1 MPa to 0.3 MPa. In this case, the lateral pressure resistance characteristics can be particularly improved.

(10) In any one of (1) to (9) above, when, after screening at a tension of 0.7 kg, a transmission loss at a wavelength of 1550 nm is measured in a bundle at 23° C. and −40° C., a transmission loss difference may be +0.5 dB/km or less. In this case, the occurrence of voids due to screening can be particularly suppressed and the low temperature characteristics can be particularly improved. For example, cables connecting data centers are laid in outdoor ducts, and temperatures can be low in cold regions. Due to the improvement in the low temperature characteristics, the optical fiber can be used in cold regions.

(11) In any one of (1) to (10) above, the cladding may include: an inner cladding covering an outer periphery of the core; a trench covering an outer periphery of the inner cladding; and an outer cladding covering an outer periphery of the trench, the inner cladding may have a refractive index lower than a refractive index of the core, the trench may have a refractive index lower than the refractive index of the inner cladding, and the outer cladding may have a refractive index higher than the refractive index of the trench and lower than the refractive index of the core. In this case, micro-bending loss may be further reduced.

(12) The optical fiber of (11) above may conform to at least one of ITU-T G.657.A2, G.657.B2, and G.657.B3. In this case, connection loss can be suppressed since, for example, the optical fiber has good connection affinity with an optical fiber routed within a data center.

(13) In (11) above, a mode field diameter at 1310 nm may be from 7.0 μm to 8.6 μm. In this case, the level of bending loss specified in ITU-T G.657.A2 and G.657.B2 can be satisfied.

Details of Embodiments of the Present Disclosure

Specific examples of an optical fiber according to this embodiment will be described with reference to the drawings as necessary. It should be noted that the present invention is not limited to these examples, but is defined by the scope of the claims, and is intended to include all modifications within the meaning and scope equivalent to the scope of the claims. Same reference signs are given to the same elements in the description of the drawings, and redundant description will be omitted.

First Embodiment

FIG. 1 is a diagram illustrating a cross-section perpendicular to an axial direction of an optical fiber 10A according to a first embodiment. Optical fiber 10A conforms to the specifications of ITU-T G.652.A1. When a mode field diameter of optical fiber 10A is from 7.0 μm to 8.6 μm, the bending loss thereof satisfies the range defined by the categories of ITU-TG.657.A2.

Optical fiber 10A includes a glass fiber 13A and a coating resin layer 16A that coats an outer periphery of glass fiber 13A. Glass fiber 13A includes a core 11 and a cladding 12. Cladding 12 surrounds core 11.

Core 11 has a diameter D1 of from 6 μm to 12 μm. Glass fiber 13A has an outer diameter D2 (that is, an outer diameter of cladding 12) of 80 μm±1 μm (that is, from 79 μm to 81 μm). Since outer diameter D2 of glass fiber 13A is the same as the outer diameter of general glass fibers, general peripheral tools such as connectors and general peripheral instruments such as fusion machines can be used. This facilitates the replacement of existing optical fibers with optical fiber 10A, and facilitates the application of optical fiber 10A.

Coating resin layer 16A has a primary resin layer 14 that coats an outer periphery of glass fiber 13A, and a secondary resin layer 15 that coats an outer periphery of primary resin layer 14. Secondary resin layer 15 is a transparent or semi-transparent resin layer. Primary resin layer 14 has a thickness t1 of 5 μm or more. Primary resin layer 14 has an outer diameter D3 of from 89 μm to 151 μm.

Primary resin layer 14 has an in situ elastic modulus of from 0.1 MPa to 0.4 MPa. The in situ elastic modulus of primary resin layer 14 is the Young's modulus at 23° C. of primary resin layer 14. When the in situ elastic modulus of primary resin layer 14 is 0.1 MPa or more, coating cracks called voids and peeling (delamination) of the coating are less likely to occur in primary resin layer 14 even when screening is performed at a tension of 0.7 kg. When voids occur, they expand at low temperatures and transmission loss increases at low temperatures. Optical fiber 10A is a void resistant specialized optical fiber and has no low-temperature characteristic problems. When, after screening optical fiber 10A at a tension of 0.7 kg, the transmission loss at a wavelength of 1550 nm is measured in a bundle at 23° C. and −40° C., the transmission loss difference is +0.5 dB/km or less. When the in situ elastic modulus of primary resin layer 14 is 0.4 MPa or less, particularly good lateral pressure resistance characteristics can be obtained in the range of thickness t1 of primary resin layer 14 mentioned above.

Primary resin layer 14 may have an in situ elastic modulus of from 0.1 MPa to 0.3 MPa. When the in situ elastic modulus of primary resin layer 14 is 0.3 MPa or less, the micro-bending loss can be particularly reduced and the lateral pressure resistance characteristics can be particularly improved. Optical fiber 10A that includes primary resin layer 14 having an in situ elastic modulus of 0.30 MPa or less is a micro-bending resistant specialized optical fiber.

Secondary resin layer 15 has a thickness t2 of from 5 μm to 20 μm. Secondary resin layer 15 has an outer diameter D4 of from 120 μm to 170 μm. Such value of outer diameter D4 enables an optical fiber element wire having a smaller outer diameter compared with the outer diameter of a conventional optical fiber element wire to be achieved, and a larger number of optical fibers to be packaged in an optical cable.

The in situ elastic modulus of secondary resin layer 15 is preferably from 1200 MPa to 2800 MPa, more preferably from 1500 MPa to 2800 MPa, and even more preferably from 2000 MPa to 2700 MPa. The in situ elastic modulus of secondary resin layer 15 is the Young's modulus at 23° C. of secondary resin layer 15. When the in situ elastic modulus of secondary resin layer 15 is 1200 MPa or more, the lateral pressure resistance characteristics tend to improve. When the in situ elastic modulus of secondary resin layer 15 is 2800 MPa or less, an appropriate toughness can be imparted to secondary resin layer 15, and the deterioration of external appearance caused by external damages and cracking of secondary resin layer 15 are less likely to occur.

In a process of producing optical fiber 10A having small outer diameter D4, optical fiber 10A tends to break more frequently compared with an optical fiber having a conventional outer diameter (for example, 250 μm). When optical fiber 10A breaks in the production process, the production efficiency of optical fiber 10A may be reduced. Concerning this problem, the inventors have found that the breakage frequency of optical fiber 10A in the production process depends on the amount of eccentricity of glass fiber 13A in optical fiber 10A.

To study the amount of eccentricity of glass fiber 13A above, the inventors of the present invention applied Fourier transform to a waveform representing the amount of eccentricity of glass fiber 13A relative to the position in an axial direction of glass fiber 13A, and analyzed the spectrum obtained by the Fourier transform.

Figure 2:
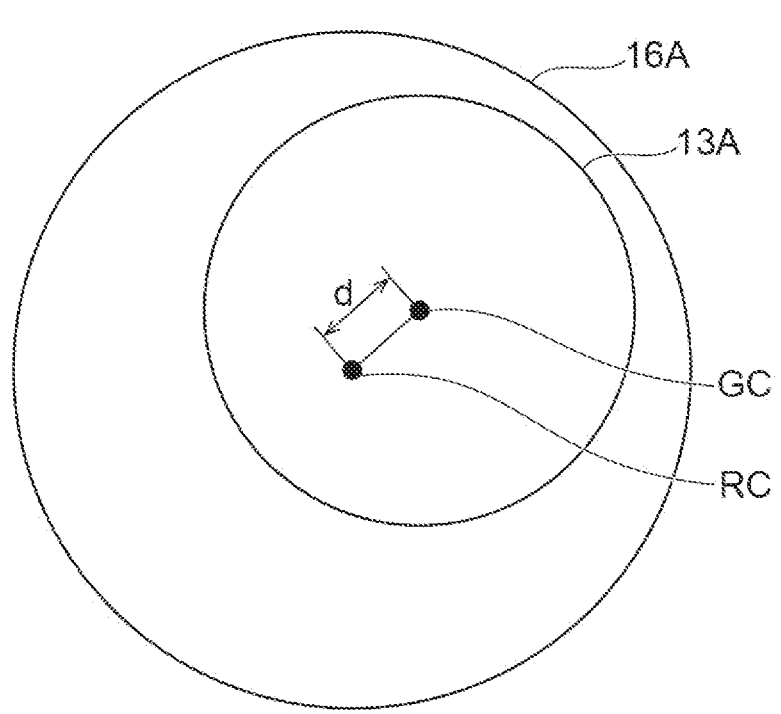
FIG. 2 is a schematic cross-sectional view for explaining the definition of an amount of eccentricity of a glass fiber.
Figure 3:
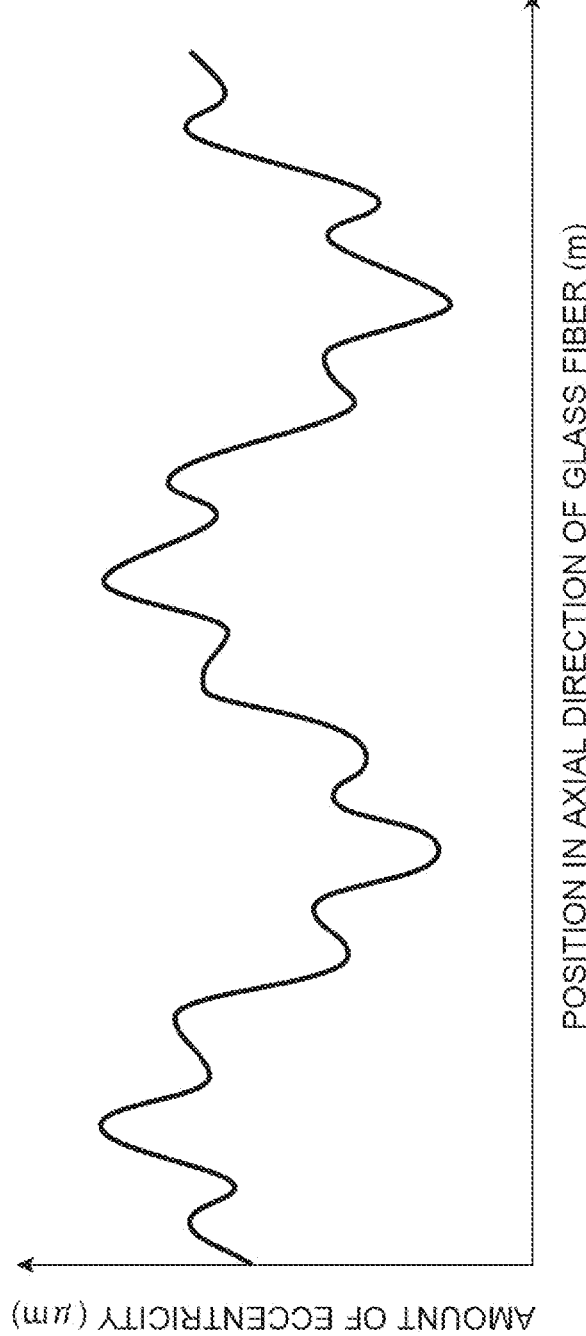
FIG. 3 is a diagram showing a waveform of amount of eccentricity representing the amount of eccentricity of a glass fiber relative to a position in an axial direction of the glass fiber.
Figure 4:
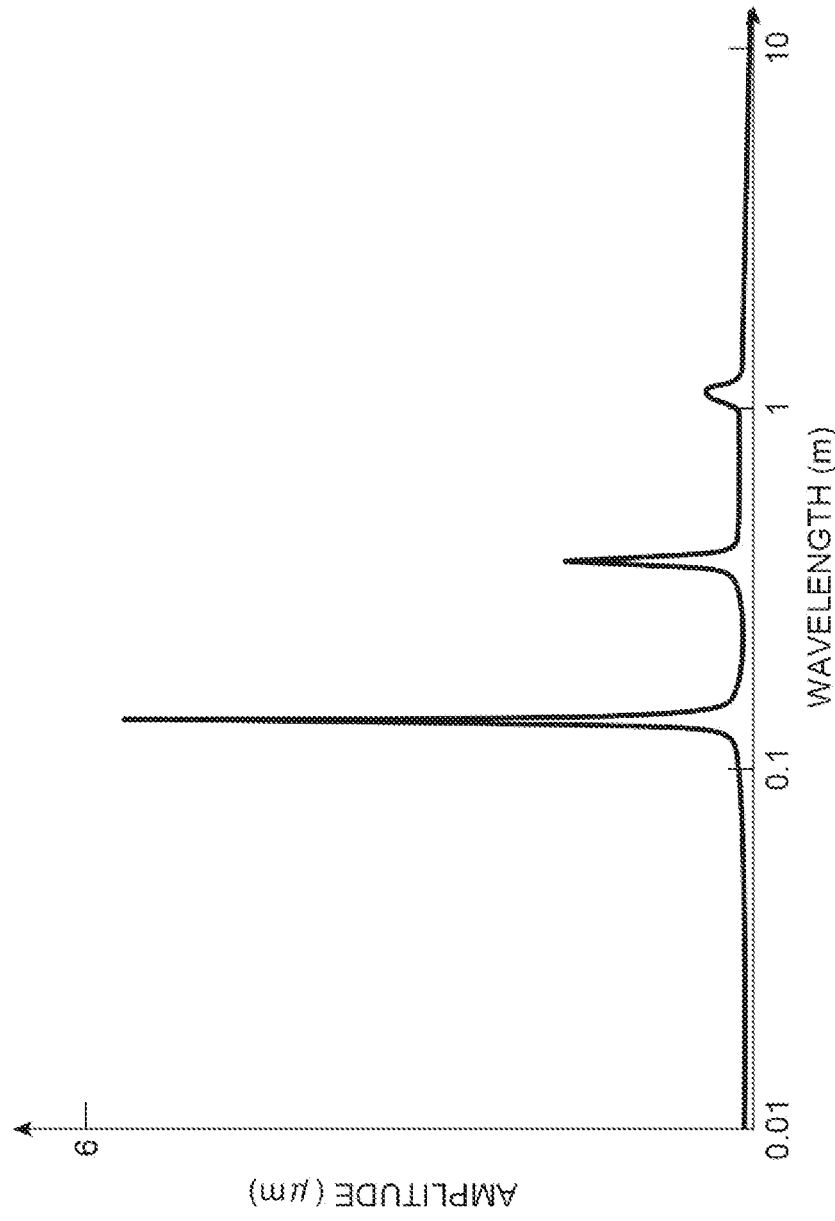
FIG. 4 is a diagram showing an example of a spectrum obtained by applying Fourier transform to the waveform of amount of eccentricity.

The amount of eccentricity of glass fiber 13A according to this embodiment will be described with reference to FIGS. 2, 3, and 4. FIG. 2 is a schematic cross-sectional view for explaining the definition of the amount of eccentricity of glass fiber 13A. FIG. 3 is a diagram showing a waveform of amount of eccentricity representing the amount of eccentricity of glass fiber 13A relative to a position in the axial direction of glass fiber 13A. FIG. 4 is a diagram showing an example of a spectrum obtained by applying Fourier transform to the waveform of amount of eccentricity.

As shown in FIG. 2, an amount of eccentricity d of glass fiber 13A is defined as the distance from a central axis RC relative to an outer periphery of secondary resin layer 15 to a central axis GC of glass fiber 13A (amount of deviation in a diameter direction, or amount of displacement in the diameter direction). Here, the amount of eccentricity of glass fiber 13A is measured, for example, by an apparatus for observing variations of amount-of-eccentricity.

The amount of eccentricity of glass fiber 13A is measured at a plurality of measurement points set at predetermined intervals in the axial direction of glass fiber 13A. The waveform (distribution) of the amount of eccentricity can be obtained by plotting the measurement results, with the positions of the plurality of measurement points represented on the horizontal axis and the amount of eccentricity at each of the positions represented on the vertical axis. Hereinafter, the waveform of the amount of eccentricity of glass fiber 13A is also referred to as the "waveform of amount of eccentricity."

For example, the waveform of amount of eccentricity shown in FIG. 3 is obtained by the above-mentioned measurements. It should be noted that the "amount of eccentricity" of the vertical axis of FIG. 3 is an absolute value of an amount of eccentricity independent of direction. As shown in FIG. 3, the waveform of amount of eccentricity of an actual optical fiber 10A has a complicated shape. Thus, as shown in FIG. 4, the present inventors applied Fourier transform to the waveform of amount of eccentricity of optical fiber 10A.

In this embodiment, in the spectrum obtained by applying Fourier transform to the waveform of the amount of eccentricity of glass fiber 13A, the maximum value of amplitude of the amount of eccentricity (amplitude value of the maximum amplitude component) is 10 μm or less as shown in FIG. 4. When the maximum value of amplitude of the amount of eccentricity is over 10 μm, the eccentricity of glass fiber 13A increases locally at positions where peaks of several frequency components of amount of eccentricity overlap. Coating resin layer 16A thus tends to be locally thin. As a result, the breakage frequency of glass fiber 13A may increase. However, in this embodiment, the maximum value of amplitude of the amount of eccentricity is 10 μm or less. In this case, local eccentricities of glass fiber 13A can be suppressed even when the peaks of the frequency components of the amount of eccentricity overlap. Thus, coating resin layer 16A can be prevented from being locally thin. As a result, the breakage frequency of glass fiber 13A can be reduced. It should be noted that the maximum value of amplitude of the amount of eccentricity is not limited, and is preferably as close to 0 μm as possible.

In this embodiment, optical fiber production apparatus 50 is, for example, configured as shown below to produce optical fiber 10A that satisfies the requirement of the amount of eccentricity of glass fiber 13A described above.

Figure 5:
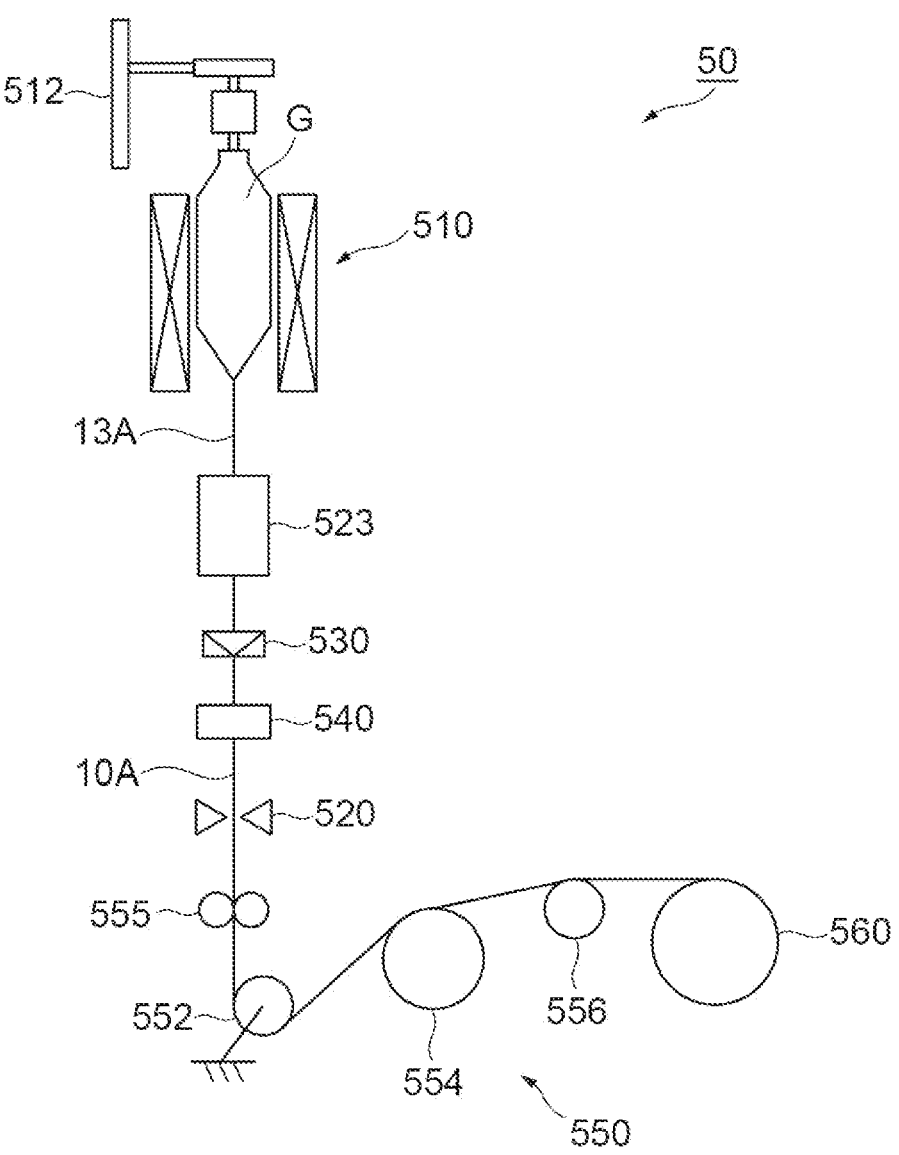
FIG. 5 is a diagram illustrating a schematic configuration of an optical fiber production apparatus according to the first embodiment.

As illustrated in FIG. 5, a vibration suppression unit 555 is disposed downstream of curing device 540 and upstream of guide roller 552 positioned directly below curing device 540. Vibration suppression unit 555 is configured to suppress vibration of optical fiber 10A, for example, by having two rollers in contact with optical fiber 10A from different directions. Suppressing vibration of optical fiber 10A using vibration suppression unit 555 enables the position of the central axis of glass fiber 13A to be maintained stably. That is, the eccentricity of glass fiber 13A can be suppressed.

Additionally, in this embodiment, guide roller 552 is, for example, fixed independently to the floor without being connected to other apparatus members related to the production of optical fiber 10A as illustrated in FIG. 5. When the guide roller 552 is used in a state in which it is fixed independently of other apparatus members related to the production of optical fiber 10A, the guide roller 552 is prevented from receiving vibration from other apparatus members. As a result, in a spectrum obtained by applying Fourier transform to the waveform of amount of eccentricity of glass fiber 13A, the maximum value of amplitude of the amount of eccentricity can be reduced, and the wavelength at which the amplitude of the amount of eccentricity is at a maximum can be increased.

In this embodiment, when a first amount of eccentricity of glass fiber 13A from the central axis relative to the outer periphery of primary resin layer 14 is compared with a second amount of eccentricity of glass fiber 13A from the central axis relative to the outer periphery of secondary resin layer 15 at a plurality of measurement points set at predetermined intervals in the axial direction of glass fiber 13A, the first amount of eccentricity may be smaller than the second amount of eccentricity. In this case, the amount of eccentricity of primary resin layer 14 having a buffer effect is reduced, and the lateral pressure resistance characteristics are improved.

The amount of eccentricity of glass fiber 13A may be measured on-line during drawing, and based on the measurement result, for example, feedback control may be provided to a dice. Specifically, the amount of eccentricity may be reduced by adjusting the position or inclination of the dice based on the measurement result. When the amount of eccentricity increases, deviations in the peripheral direction may occur in the thickness of primary resin layer 14. In a thick portion of primary resin layer 14, tensile stress may be induced and voids may occur. The occurrence of voids can be suppressed by reducing the amount of eccentricity.

Variation of First Embodiment

Figure 6:
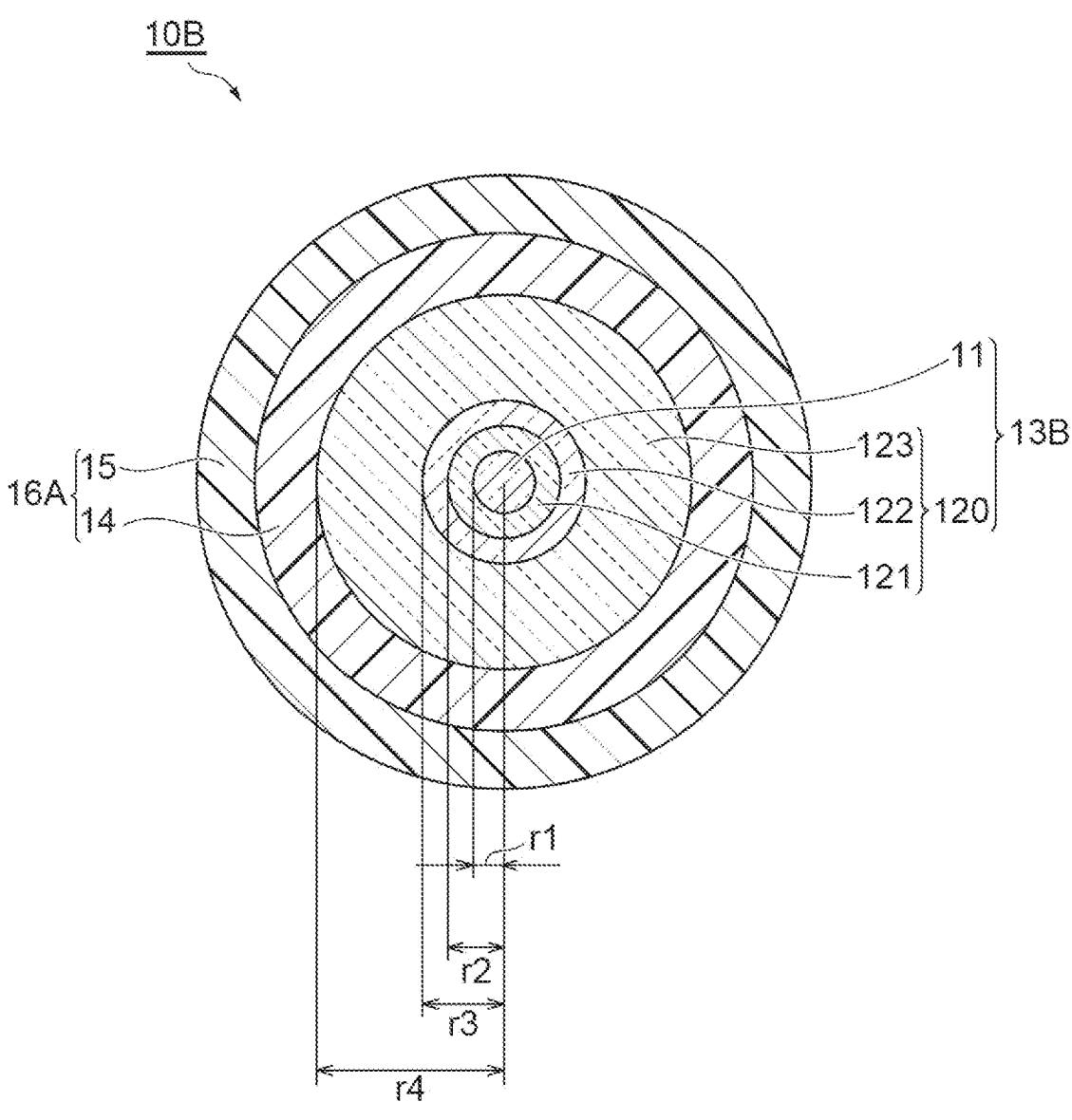
FIG. 6 is a diagram illustrating a cross-section perpendicular to an axial direction of an optical fiber according to a variation of the first embodiment.

FIG. 6 is a diagram illustrating a cross-section perpendicular to an axial direction of an optical fiber 10B according to a variation of the first embodiment. Optical fiber 10B includes a glass fiber 13B instead of glass fiber 13A (see FIG. 1). Glass fiber 13B includes a cladding 120 instead of cladding 12 (see FIG. 1) to further reduce micro-bending loss while trying to reduce the diameter. Glass fiber 13B conforms, for example, to at least one of ITU-T G.657.A2, G.657.B2, and G.657.B3.

Cladding 120 surrounds core 11. Cladding 120 includes an inner cladding 121 that is in contact with an outer peripheral surface of core 11, a trench 122 that is in contact with an outer peripheral surface of inner cladding 121, and an outer cladding 123 that is in contact with an outer peripheral surface of trench 122.

Figure 7:
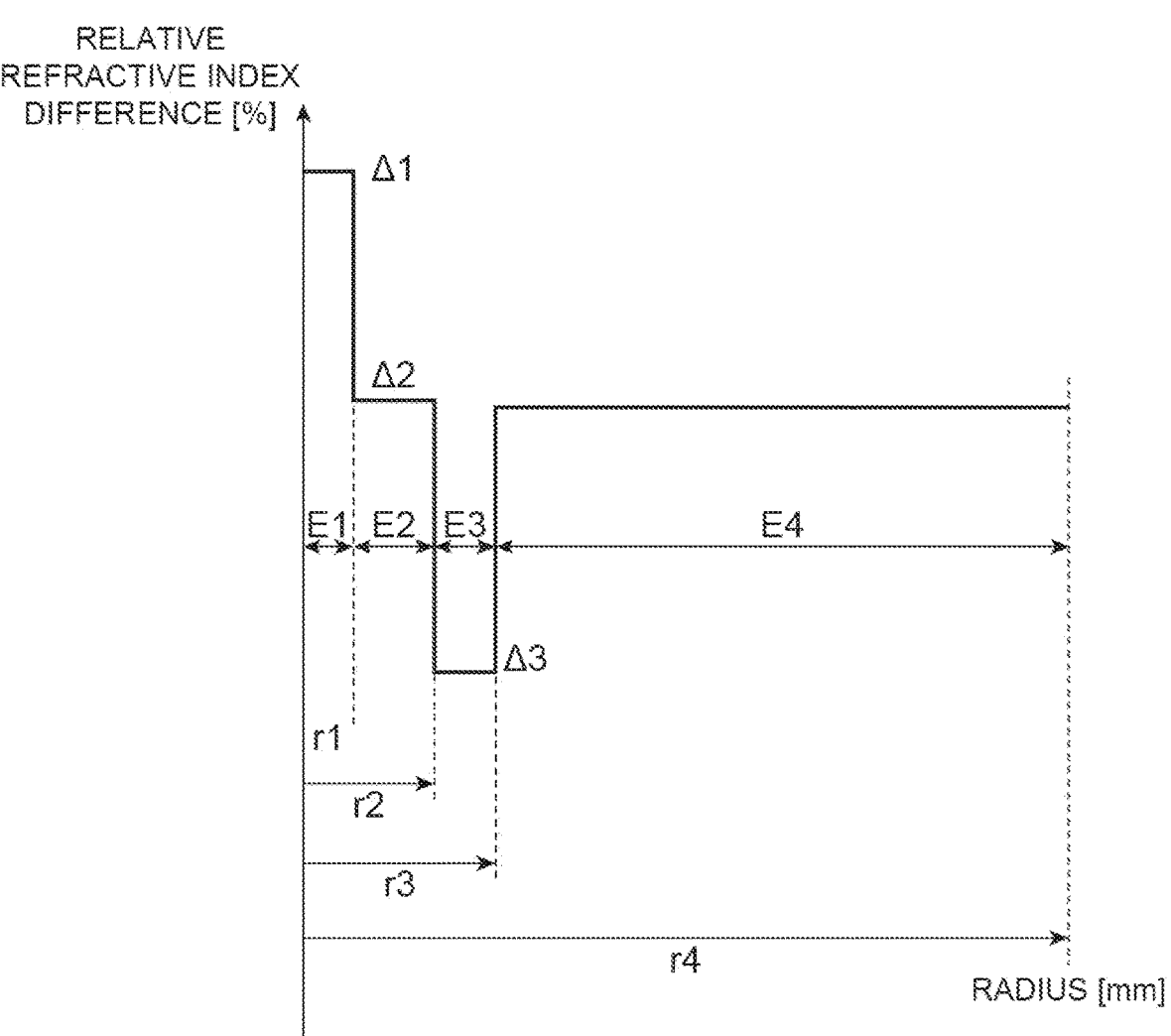
FIG. 7 is a diagram showing a refractive index distribution in a radial direction of the glass fiber.

FIG. 7 is a diagram showing a refractive index distribution in a radial direction of glass fiber 13B (portion of the glass fiber outward of the center). In FIG. 7, range E1 corresponds to core 11, range E2 to inner cladding 121, range E3 to trench 122, and range E4 to outer cladding 123. The vertical axis represents the relative refractive index difference, and the horizontal axis represents the position in the radial direction. As shown in FIG. 7, in glass fiber 13B, relative refractive index differences of core 11, inner cladding 121, and trench 122 relative to the relative refractive index of outer cladding 123 (ratio relative to the refractive index of quartz glass) are represented by Δ1, Δ2, and Δ3, respectively. Here, relative refractive index difference Δ2 of inner cladding 121 is less than relative refractive index difference Δ1 of core 11. Relative refractive index difference Δ3 of trench 122 is less than relative refractive index difference 42 of inner cladding 121. The sign of relative refractive index difference Δ3 of trench 122 is negative, and the sign of relative refractive index difference Δ1 of core 11 is positive. The sign of the relative refractive index difference being negative means that the refractive index is less than the refractive index of outer cladding 123.

The value obtained by subtracting relative refractive index difference Δ2 of inner cladding 121 from relative refractive index difference Δ1 of core 11 (Δ1-Δ2) is from 0.15% to 0.40%. In one Example, the value (Δ1-Δ2) is 0.34%. Such relatively small value (Δ1-Δ2) enables a mode field diameter of optical fiber 10B to be enlarged. An absolute value |Δ2| of relative refractive index difference Δ2 of inner cladding 121 is 0.10% or less. Relative refractive index difference Δ3 of trench 122 is from –0.70% to –0.20%. Relative refractive index difference Δ3 of trench 122 being in such a range eliminates the need to add an extremely large amount of fluorine in a step of sintering glass. Relative refractive index difference Δ3 of trench 122 may be less than –0.25%.

The radius of glass fiber 13B, is within the range of 80 $\mu$m±1 $\mu$m similarly to glass fiber 13A.

In optical fiber 10B, the mode field diameter for light having a wavelength of 1310 nm is from 8.2 $\mu$m to 9.6 $\mu$m. The mode field diameter is based on the definition of Petermann-I. Optical fiber 10B satisfies the level of bending loss specified in G.657.A or B.

First Example

Hereinafter, the results of evaluation tests performed using Experimental Examples and Comparative Examples according to the first embodiment, and Experimental Examples and Comparative Examples according to the variation of the first embodiment are shown. It should be noted that the present invention is not limited to these Examples.

A plurality of samples of the optical fiber were produced by forming a primary resin layer on the outer periphery of a glass fiber, and further forming a secondary resin layer on the outer periphery thereof. Table 1 shows the outer diameter ($\mu$m) of the glass fiber, the outer diameter ($\mu$m) of the primary resin layer, the outer diameter ($\mu$m) of the secondary resin layer, the in situ elastic modulus (MPA) of the primary resin layer, the in situ elastic modulus (MPA) of the secondary resin layer, the thickness ($\mu$m) of the coating resin layer, the thickness ($\mu$m) of the primary resin layer, the thickness ($\mu$m) of the secondary resin layer, the maximum value of amplitude of the amount of eccentricity ($\mu$m) of the glass fiber, the coating clearance ($\mu$m) being the value obtained by subtracting the maximum value of amplitude of the amount of eccentricity of the glass fiber from the thickness of the coating resin layer, the categories of ITU-T G.657, the lateral pressure resistance characteristics, the void resistance, the breakage frequency, and the external appearance of the secondary resin layer of each of the produced samples.

TABLE 1

| Sample No. | | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|---|
| Outer | Glass | 80 | 80 | 80 | 80 | 80 | 80 | 80 | 80 | 80 | 80 | 80 | 80 |
| diameter | Primary | 150 | 150 | 150 | 90 | 110 | 105 | 110 | 120 | 150 | 150 | 120 | 120 |
| [μm] | Secondary | 160 | 160 | 160 | 120 | 120 | 130 | 140 | 150 | 160 | 160 | 150 | 150 |
| In situ | Primary | 0.1 | 0.15 | 0.2 | 0.1 | 0.1 | 0.2 | 0.2 | 0.2 | 0.1 | 0.1 | 0.02 | 0.1 |
| elastic modulus [MPa] | Secondary | 1200 | 2000 | 2500 | 1200 | 2800 | 2800 | 2500 | 2000 | 1000 | 3000 | 2000 | 2000 |
| Thickness [μm] | Coating resin | 40 | 40 | 40 | 20 | 20 | 25 | 30 | 35 | 40 | 40 | 35 | 35 |
| | Primary | 35 | 35 | 35 | 5 | 15 | 12.5 | 15 | 20 | 35 | 35 | 20 | 20 |
| | Secondary | 5 | 5 | 5 | 15 | 5 | 12.5 | 15 | 15 | 5 | 5 | 15 | 15 |
| Maximum value of amplitude of amount of eccentricity [μm] | | 4 | 0 | 2 | 1 | 3 | 2 | 0 | 5 | 6 | 3 | 5 | 12 |
| Coating clearance [μm] | | 36 | 40 | 38 | 19 | 17 | 23 | 30 | 30 | 34 | 37 | 30 | 27 |
| G.657 categories | | A2 | A2 | A2 | B3 | B3 | B2 | A1 | A2 | A2 | A2 | A2 | A2 |
| Lateral pressure resistance characteristics | | A | A | A | B | B | B | A | A | C | A | A | A |
| Void resistance | | A | A | A | A | A | A | A | A | A | A | B | A |
| Breakage frequency | | A | A | A | A | A | A | A | A | A | A | A | B |
| External Appearance | | A | A | A | A | A | A | A | A | A | B | A | A |

[Maximum Value of Amplitude of Amount of Eccentricity]

The amount of eccentricity of the glass fiber was measured at a plurality of measurement points set at predetermined intervals in the axial direction of the glass fiber using an apparatus for observing variations of amount-of-eccentricity to obtain a waveform of the amount of eccentricity at each position of the plurality of measurement points. Subsequently, the waveform of amount of eccentricity of the optical fiber was subjected to Fourier transform (FFT: fast Fourier transform), and a spectrum obtained by the Fourier transform was analyzed. The maximum value of amplitude of the amount of eccentricity in the spectrum obtained by applying Fourier transform to the waveform of amount of eccentricity was thus obtained.

[In Situ Elastic Modulus]

The in situ elastic modulus of the primary resin layer was measured by a Pullout Modulus (POM) method at 23° C. A metal cylinder was adhered to each of two sites (separated by a predetermined interval) of the optical fiber. The coating resin layer (primary resin layer and secondary resin layer) portion between the cylinders was removed to expose glass. The optical fiber on outer sides of the metal cylinders (each side away from the other metal cylinder) was cut off (the length of the optical fiber is the sum of the lengths of the portions adhered to the metal cylinders and the portion between the metal cylinders). One of the metal cylinders was then fixed, and the other metal cylinder was gently moved slightly in the direction opposite to the fixed metal cylinder. The in situ elastic modulus of the primary resin layer was obtained from the following formula, with L being the length of the metal cylinder (length over which the optical fiber is adhered), Z being the amount of movement of a chuck, Dp being the outer diameter of the primary resin layer, Df being the outer diameter of the glass fiber, n being the Poisson ratio of the primary resin layer, and W being the load of the chuck during movement:

$$\textit{In situ} \text{ elastic modulus } (MPa) = \left((1 + n)W/\pi LZ\right) \times \ln\left(Dp/Df\right)$$

Here, it was considered that the glass fiber, the secondary resin layer, and the adhered portions did not deform (did not stretch), and that the metal cylinder moved due to the deformation of the primary resin layer.

The in situ elastic modulus of the secondary resin layer was obtained from the 2.5% secant value by performing a tensile test (gauge length: 25 mm) in an environment of 23° C.±2° C. and 50%±10% RH using a pipe-shaped coating resin layer (length: 50 mm or more) obtained by pulling out the glass fiber from the optical fiber.

[Lateral Pressure Resistance Characteristics]

The transmission loss of the optical fiber was measured in a state in which only one layer of 500 m of the optical fiber was wound, at a tension of 80 g, onto a bobbin having a body diameter of 405 mm and onto which a flatly wound plainly woven metal mesh having a wire outer diameter of 50 μm and a pitch of 150 μm was wound. This optical fiber was wound onto a bobbin having a body diameter of 280 mm and then removed from the bobbin, so that the optical fiber was wound in an annular shape having a diameter of about 280 mm. The transmission loss of the optical fiber was measured in that state (three measurements were made for each case, and an average value was obtained). The difference between the average values was taken as the transmission loss difference. Here, the transmission loss is the transmission loss of light having a wavelength of 1550 nm and was calculated from a loss spectrum measured by a cutback method. Cases in which the transmission loss difference was 1.0 dB/km or less were rated lateral pressure resistance characteristic "A," cases in which the transmission loss difference was over 1.0 dB/km and 1.5 dB/km or less were rated lateral pressure resistance characteristic "B," and cases in which the transmission loss difference was over 1.5 dB/km were rated lateral pressure resistance characteristic "C."

[Void Resistance (Low-Temperature Characteristics)]

Screening was performed by winding the optical fiber onto a bobbin having a body diameter of 280 mm at a tension of 0.7 kg (more specifically, from 0.6 kg to 0.8 kg). The optical fiber was removed from the bobbin, so that the optical fiber was wound in a bundle in an annular shape having a diameter of about 280 mm. The transmission loss of the optical fiber at a wavelength of 1550 nm was measured in a bundle at 23° ° C. and −40° ° C. (three measurements were made for each case, and an average value was obtained). The difference between the average values (value obtained by subtracting the average value of transmission loss at 23° C. from the average value of transmission loss at −40° C.) was taken as the transmission loss difference. Here, the transmission loss is the transmission loss of light having a wavelength of 1550 nm and was calculated from a loss spectrum measured by a cutback method. When voids occur, they expand and transmission loss occurs at low temperatures. Thus, cases in which the transmission loss difference was 1.0 dB/km or less were rated void resistance "A," and cases in which the transmission loss difference was over 1.0 dB/km were rated void resistance "B."

[Breakage Frequency]

Cases in which the number of times of breakage during rewinding of the optical fiber having a length of 1000 km (i.e., 1 Mm) at a tension of 0.7 kg (more specifically, from 0.6 kg to 0.8 kg) was 50 or less were rated breakage frequency "A," and cases in which the number of times thereof was over 50 were rated breakage frequency "B."

[External Appearance]

External appearance of the optical fiber wound onto a bobbin was evaluated by visually observing the presence of external damages such as cracks in the secondary resin layer. Cases in which there were no damages were rated external appearance "A," and cases in which there were damages or abnormalities in the external appearance were rated external appearance "B."

The optical fiber of Sample No. 1-7 is Example of optical fiber 10A according to the first embodiment. That is, the optical fiber of Sample No. 1-7 uses a glass fiber having a structure similar to that of glass fiber 13A. The optical fibers of Sample Nos. 1-1 to 1-6 are Examples of optical fiber 10B according to the variation of the first embodiment, and the optical fibers of Sample Nos. 1-8 to 1-12 are Comparative Examples of optical fiber 10B. That is, the optical fibers other than the optical fiber of Sample No. 1-7 use a glass fiber having a structure similar to that of glass fiber 13B, and satisfy the level of bending loss specified in ITU-T G.657.A2, B2, and B3.

The optical fibers of Sample Nos. 1-1 to 1-8 have an in situ elastic modulus of the primary resin layer of 0.4 MPa or less, and are thus void resistant specialized optical fibers. The optical fibers of Sample Nos. 1-1 to 1-8 have an in situ elastic modulus of the primary resin layer of 0.3 MPa or less, and are thus micro-bending resistant specialized optical fibers.

According to the Examples and Comparative Examples, the lateral pressure resistance characteristics are rated A or B, the void resistance is rated A, the breakage frequency is rated A, the breakage probability is rated A, and the external appearance is rated A, when the outer diameter of the glass fiber is 80 μm, the thickness of the primary resin layer is from 5 μm to 35 μm, the thickness of the secondary resin layer is from 5 μm to 15 μm, the outer diameter of the secondary resin layer is from 120 μm to 160 μm, the in situ elastic modulus of the primary resin layer is from 0.1 MPA to 0.2 MPa, the in situ elastic modulus of the secondary resin layer is from 1200 MPa to 2800 MPa, and the maximum value of amplitude of the amount of eccentricity of the glass fiber is 10 μm or less, so that an optical fiber which has a reduced diameter and is capable of suppressing deterioration of the lateral pressure resistance characteristics and void resistance (low-temperature characteristics) can be provided. In this optical fiber, the deterioration of external appearance and the breakage frequency are also suppressed.

The breakage frequency increased in the optical fiber of Sample No. 1-12 since the maximum value of amplitude of the amount of eccentricity was over 10 μm due to the fact that no vibration control parts were used in the production. Vibration control parts were also not used in the production of the optical fiber of Sample No. 1-1. The optical fiber of Sample No. 1-10 had a defective external appearance since the in situ elastic modulus of the secondary resin layer was over 2800 MPa, so that the coating was brittle and cracks were formed in the secondary resin layer. In the optical fiber of Sample No. 1-9, the in situ elastic modulus of the secondary resin layer was less than 1200 MPa, so that the lateral pressure resistance characteristics were insufficient and the transmission loss increased. In the optical fiber of Sample No. 1-11, the in situ elastic modulus of the primary resin layer was less than 0.1 MPa, so that the lateral pressure resistance characteristics were insufficient and the transmission loss increased, voids occurred, and the transmission loss increased in low temperatures.

In this Example, a primary resin layer having a Young's modulus of 0.1 MPa, a primary resin layer having a Young's modulus of 0.15 MPa, and a primary resin layer having a Young's modulus of 0.2 MPa were obtained by a resin composition 1 (hereinafter, "resin P1") shown in Table 2. Additionally, a primary resin layer having a Young's modulus of 0.3 MPa and a primary resin layer having a Young's modulus of 0.4 MPa were obtained by a resin composition 2 (hereinafter, "resin P2") shown in Table 2. Additionally, a primary resin layer having a Young's modulus of 0.6 MPa was obtained by a resin composition 3 (hereinafter, "resin P3") shown in Table 2. Additionally, a primary resin layer having a Young's modulus of 0.02 MPa was obtained by a resin composition 4 shown in Table 2. Urethane oligomer (I) is specifically HEA-TDI-(PPG3000-TDI)$_{2,1}$-HEA, urethane oligomer (II) is specifically HEA-TDI-(PPG3000-TDI)$_{2,1}$-EH, and urethane oligomer (III) is specifically HEA-TDI-(PPG3000-TDI)$_{2,1}$-SiI.

TABLE 2

| | Resin composition No. | | 1 | 2 | 3 | 4 |
|---|---|---|---|---|---|---|
| Composition (% by mass) | Urethane oligomer | (I) | 2.0 | 3.0 | 5.0 | 7.0 |
| | | (II) | 75 | 70 | 68 | 66 |
| | | (III) | 7.0 | 7.0 | 7.0 | 7.0 |
| | Radical polymerizable non-urethane monomer | 2-Ethylhexyl acrylate | 10 | 10 | 10 | 10 |
| | | N-vinylcaprolactam | 8.5 | 8.5 | 8.5 | 8.5 |
| | | Trimethylpropane triacrylate | 0.50 | 0.50 | 0.50 | 0.50 |
| | | Trimethoxysilylpropyl methacrylate | 0.15 | 0.15 | 0.15 | 0.15 |

TABLE 2-continued

| Resin composition No. | | 1 | 2 | 3 | 4 |
|---|---|---|---|---|---|
| Non-radical polymerizable alkoxysilane | Tetraethoxysilane | 0.50 | 0.50 | 0.50 | 0.50 |
| Photopolymerization initiator | 2,4,6-Trimethylbenzoyldiphenylphosphine oxide | 1.2 | 1.2 | 1.2 | 1.2 |
| Additive | Hindered phenol-based oxidation inhibitor | 0.60 | 0.60 | 0.60 | 0.60 |

In this Example, differences in the Young's modulus were obtained by UV power adjustment or selection based on variations in the samples on the basis of Table 3 below for the secondary resin layers having a Young's modulus of 1000 MPa, 1200 MPa, and 2000 MPa (hereinafter, "resin S1") among the secondary resin layers of the samples. UA1 was produced by reacting 2,4-tolylene diisocyanate with polypropylene glycol (number average molecular weight 2000) at a weight ratio of 1:5.7. UA2 was produced by reacting 2,4-tolylene diisocyanate with polypropylene glycol (number average molecular weight 10000) at a weight ratio of 1:28

TABLE 3

| Component | Parts by mass (%) |
|---|---|
| UA1 | 20.0 |
| UA2 | 1.0 |
| Bisphenol A epoxy diacrylate | 48.0 |
| Tripropylene glycol diacrylate | 32.0 |
| 1-Hydroxycyclohexyl phenyl ketone | 2.0 |
| 2,4,6-Trimethylbenzoyldiphenylphosphine oxide | 0.4 |

In this Example, the composition shown in Table 4 below was adopted for the secondary resin layers having a Young's modulus of 2500 MPa, 2800 MPa and 3000 MPa (hereinafter, "resin S2") among the secondary resin layers of the samples, and differences in the Young's modulus were obtained by UV power adjustment or selection based on variations in the samples. UA is urethane acrylate obtained by reacting a polypropylene glycol having a molecular weight of 600, 2,4-tolylene diisocyanate, and hydroxyethyl acrylate. EA is epoxy diacrylate.

TABLE 4

| Oligomer (% by mass) | UA | 50 |
|---|---|---|
| | EA | 10 |
| Monomer (% by mass) | Isobornyl acrylate | 10 |
| | Tripropylene glycol diacrylate | 13 |
| | 2-Phenoxyethyl acrylate | 17 |
| Silica particles (% by mass) | | 65 |

Second Embodiment

Figure 8:
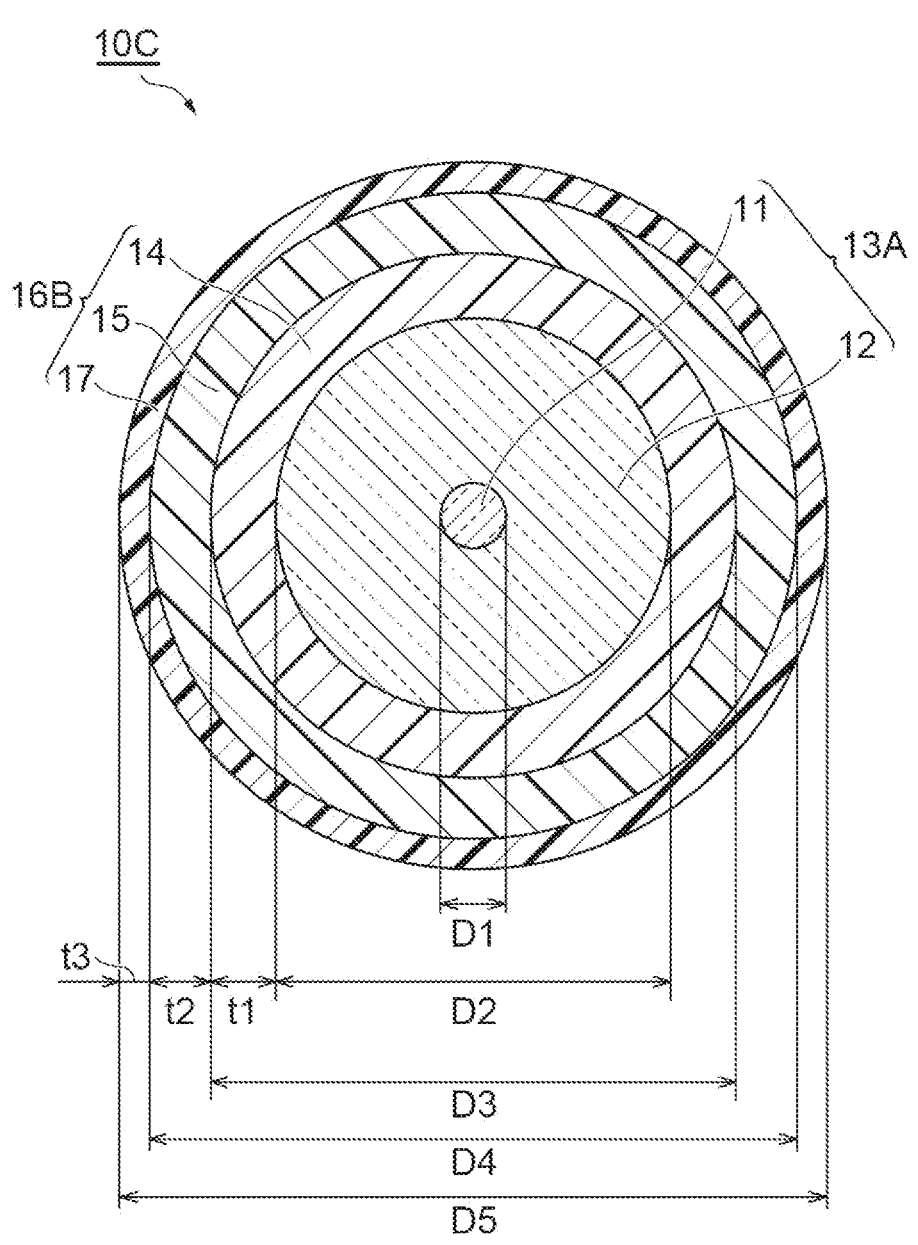
FIG. 8 is a diagram illustrating a cross-section perpendicular to an axial direction of an optical fiber according to a second embodiment.

FIG. 8 is a diagram illustrating a cross-section perpendicular to an axial direction of an optical fiber 10C according to a second embodiment. Optical fiber 10C is a so-called optical fiber core wire, and includes glass fiber 13A including core 11 and cladding 12, and a coating resin layer 16B including primary resin layer 14, secondary resin layer 15, and a coating layer 17 provided on the outer periphery of glass fiber 13A. Among these constituent elements, the structure and characteristics of glass fiber 13A and secondary resin layer 15 are similar to those of the first embodiment described above.

Coating layer 17 is in contact with an outer peripheral surface of secondary resin layer 15, and coats the entire secondary resin layer 15. Coating layer 17 forms the outermost layer of coating resin layer 16B. Coating layer 17 has a thickness t3 of from 3.0 μm to 8.0 μm. An outer diameter D5 of coating layer 17, that is, the outer diameter of coating resin layer 16B, is 170 μm±5 μm, that is, from 165 μm to 175 μm. Coating layer 17 is a colored resin layer including a pigment or a dye. In the case in which coating resin layer 16B has colored coating layer 17 such as in this embodiment, identification of optical fiber 10C is facilitated by coating layer 17.

Coating layer 17 is formed of a cured product of a resin composition further including an ultraviolet curable resin and a mold release agent. The mold release agent facilitates the removal of a tape material when optical fiber 10C is formed into a tape. Forming into a tape refers, for example, to covering a plurality of (e.g., 2 to 32) optical fiber core wires that are arranged in parallel with a tape material to form into a tape. The tape material is removed and the optical fiber core wire is exposed in the processing of tape ends that is performed, for example, for attaching a connector to the tape or connecting the tape to other members. When optical fiber element wires are formed into a tape, adhesion between the secondary resin layer and the tape material is strong, so that it is not possible to remove only the tape material. Optical fiber 10C includes coating layer 17 which includes a mold release agent, so that it is easy to remove only the tape material.

Thickness t3 of coating layer 17 being 3.0 μm or more causes the color of the core wire to be dark enough in the external appearance, so that distinguishability is improved. Additionally, color unevenness caused by the vibration of optical fiber 10C in the production process can be suppressed. Furthermore, since coating layer 17 includes a pigment or a dye, if coating layer 17 has an excessive thickness, ultraviolet radiation for curing coating layer 17 will not reach deep enough into coating layer 17, and coating layer 17 may not be sufficiently cured. When curing of coating layer 17 is insufficient, the adhesive force between coating layer 17 and secondary resin layer 15 will be reduced, and a so-called "color peeling" may occur, in which coating layer 17 does not separate from the tape material but separates from secondary resin layer 15 when removing the tape material. Thickness t3 of coating layer 17 being 10.0 μm or less enables ultraviolet radiation for curing coating layer 17 to reach deep enough into coating layer 17, so that the "color peeling" above can be reduced.

In optical fiber 10C of this embodiment, the in situ elastic modulus of primary resin layer 14 is slightly greater compared with the first embodiment due to the irradiation with ultraviolet radiation for curing coating layer 17. This is considered to be because primary resin layer 14 is further cured by the irradiation with ultraviolet radiation for curing coating layer 17.

That is, in optical fiber 10C of this embodiment, the in situ elastic modulus of primary resin layer 14 at 23° ° C. may be from 0.1 MPa to 0.5 MPa. When the in situ elastic modulus of primary resin layer 14 is 0.1 MPa or more, coating cracks called voids and peeling (delamination) of the coating are less likely to occur in primary resin layer 14 at a screening tension of 0.7 kg or more. When voids occur, they expand at low temperatures and the transmission loss increases at low temperatures. Optical fiber 10C is a void resistant specialized optical fiber and has no low-temperature characteristic problems. When, after screening optical fiber 10C at a tension of 0.7 kg, the transmission loss at a wavelength of 1550 nm is measured in a bundle at 23° C. and −40° C., the transmission loss difference is 1.0 dB/km or less. When the in situ elastic modulus of primary resin layer 14 is 0.5 MPa or less, particularly good lateral pressure resistance characteristics can be obtained in the range of thickness t1 of primary resin layer 14 mentioned above.

Primary resin layer 14 may have an in situ elastic modulus of from 0.1 MPa to 0.3 MPa. When the in situ elastic modulus of primary resin layer 14 is 0.3 MPa or less, the micro-bending loss can be particularly reduced and the lateral pressure resistance characteristics can be particularly improved. Optical fiber 10C that includes primary resin

16

Second Example

Hereinafter, the results of evaluation tests performed using Experimental Examples and Comparative Examples according to the second embodiment, and Experimental Examples and Comparative Examples according to the variation of the second embodiment are shown. It should be noted that the present invention is not limited to these Examples.

A plurality of samples of the optical fiber were produced by forming a primary resin layer on the outer periphery of a glass fiber, further forming a secondary resin layer on the outer periphery thereof, and further forming a coating layer on the outer periphery thereof. Table 5 shows the outer diameter (μm) of the glass fiber, the outer diameter (μm) of the primary resin layer, the outer diameter (μm) of the secondary resin layer, the outer diameter (μm) of the coating layer, the in situ elastic modulus (MPa) of the primary resin layer, the in situ elastic modulus (MPa) of the secondary resin layer, the thickness (μm) of the coating resin layer, the thickness (μm) of the primary resin layer, the thickness (μm) of the secondary resin layer, the thickness (μm) of the coating layer, the maximum value of amplitude of the amount of eccentricity (μm) of the glass fiber, the coating clearance (μm), the categories of ITU-T G.657, the lateral pressure resistance characteristics, the void resistance, the breakage frequency, and the external appearance of the secondary resin layer of each of the produced samples.

TABLE 5

| Sample No. | | 2-1 | 2-2 | 2-3 | 2-4 | 2-5 | 2-6 | 2-7 | 2-8 | 2-9 | 2-10 | 2-11 | 2-12 |
|---|---|---|---|---|---|---|---|---|---|---|---|---|---|
| Outer diameter [μm] | Glass | 80 | 80 | 80 | 80 | 80 | 80 | 80 | 80 | 80 | 80 | 80 | 80 |
| | Primary | 150 | 150 | 150 | 90 | 110 | 105 | 110 | 120 | 150 | 150 | 120 | 120 |
| | Secondary | 160 | 160 | 160 | 120 | 120 | 130 | 140 | 150 | 160 | 160 | 150 | 150 |
| | Coating | 170 | 170 | 170 | 130 | 130 | 140 | 150 | 160 | 170 | 170 | 160 | 160 |
| In situ elastic modulus [MPa] | Primary | 0.1 | 0.2 | 0.3 | 0.1 | 0.1 | 0.3 | 0.3 | 0.3 | 0.1 | 0.1 | 0.02 | 0.1 |
| | Secondary | 1200 | 2000 | 2500 | 1200 | 2800 | 2800 | 2500 | 2000 | 1000 | 3000 | 2000 | 2000 |
| Thickness [μm] | Coating resin | 45 | 45 | 45 | 25 | 25 | 30 | 35 | 40 | 45 | 45 | 40 | 40 |
| | Primary | 35 | 35 | 35 | 5 | 15 | 12.5 | 15 | 20 | 35 | 35 | 20 | 20 |
| | Secondary | 5 | 5 | 5 | 15 | 5 | 12.5 | 15 | 15 | 5 | 5 | 15 | 15 |
| | Coating | 5 | 5 | 5 | 5 | 5 | 5 | 5 | 5 | 5 | 5 | 5 | 5 |
| Maximum value of amplitude of amount of eccentricity [μm] | | 5 | 4 | 0 | 2 | 1 | 5 | 5 | 5 | 6 | 4 | 6 | 12 |
| Coating clearance [μm] | | 40 | 41 | 45 | 23 | 24 | 25 | 30 | 35 | 39 | 41 | 34 | 32 |
| G.657 categories | | A2 | A2 | A2 | B3 | B3 | B2 | A2 | A1 | A2 | A1 | A2 | A2 |
| Lateral pressure resistance characteristics | | A | A | A | B | B | B | A | A | C | A | A | A |
| Void resistance | | A | A | A | A | A | A | A | A | A | A | B | A |
| Breakage frequency | | A | A | A | A | A | A | A | A | A | A | A | B |
| External appearance | | A | A | A | A | A | A | A | A | A | B | A | A | layer 14 having an in situ elastic modulus of 0.3 MPa or less is a micro-bending resistant specialized optical fiber.

In this embodiment, the structure and characteristics of primary resin layer 14 are similar to those of the first embodiment above, except for the in situ elastic modulus.

Variation of Second Embodiment

Although illustration is omitted, an optical fiber according to a variation of the second embodiment includes glass fiber 13B (see FIG. 6) instead of glass fiber 13A (see FIG. 8). The structure and characteristics of glass fiber 13B are similar to those of the variation of the first embodiment.

The specific compositions of the primary resin layer and the secondary resin layer are similar to those of the first embodiment. However, the in situ elastic modulus of the primary resin layer is slightly greater (from 0 MPa to up to about 0.1 MPa) than the First Example due to the irradiation with ultraviolet radiation for curing the coating layer. The method for measuring the in situ elastic modulus of the primary resin layer and the secondary resin layer is similar to that of the First Example. That is, in the method for measuring the in situ elastic modulus of the primary resin layer, it was considered that the coating layer did not deform (stretch) similarly to the glass fiber, the secondary resin layer, and the adhered portions, and that the metal cylinder moved due to the deformation of the primary resin layer. In the method for measuring the in situ elastic modulus of the secondary resin layer, it was considered that the result of the tensile test was due to the deformation of the secondary resin layer. The measurement method and evaluation criteria for the maximum value of amplitude of the amount of eccentricity, the in situ elastic modulus, and the lateral pressure resistance characteristics, and the measurement method and evaluation criteria for the screening tension are also similar to those of the First Example.

The optical fiber of Sample No. 2-8 is Example of optical fiber 10C according to the second embodiment, and the optical fiber of Sample No. 2-10 is Comparative Examples of optical fiber 10C. The optical fibers of Sample Nos. 2-1 to 2-7 are Examples of the optical fiber according to the variation of the second embodiment, and the optical fibers of Sample Nos. are Comparative Examples of the optical fiber according to the variation of the second embodiment.

The optical fibers of Sample Nos. 2-1 to 2-8 have an in situ elastic modulus of the primary resin layer of 0.4 MPa or less, and are thus void resistant specialized optical fibers. The optical fibers of Sample Nos. 2-1 to 2-8 have an in situ elastic modulus of the primary resin layer of 0.3 MPa or less, and are thus micro-bending resistant specialized optical fibers.

According to the Examples and Comparative Examples, the lateral pressure resistance characteristics are rated A or B, the void resistance is rated A, the breakage frequency is rated A, the breakage probability is rated A, and the external appearance is rated A when the outer diameter of the glass fiber is 80 μm, the thickness of the primary resin layer is from 5 μm to 35 μm, the thickness of the secondary resin layer is from 5 μm to 15 μm, the thickness of the coating layer is 5 μm, the outer diameter of the secondary resin layer is from 120 μm to 160 μm, the in situ elastic modulus of the primary resin layer is from 0.1 MPA to 0.3 MPa, the in situ elastic modulus of the secondary resin layer is from 1200 MPa to 2800 MPa, and the maximum value of amplitude of the amount of eccentricity of the glass fiber is 10 μm or less, so that an optical fiber which has a reduced diameter and is capable of suppressing deterioration of the lateral pressure resistance characteristics and void resistance (low-temperature characteristics) can be provided. In this optical fiber, the deterioration of external appearance and the breakage frequency are also suppressed.

The breakage frequency increased in the optical fiber of Sample No. 2-12 since the maximum value of amplitude of the amount of eccentricity was over 10 μm due to the fact that no vibration control parts were used in the production. The optical fiber of Sample No. 2-10 had a defective external appearance since the in situ elastic modulus of the secondary resin layer was over 2800 MPa, so that the coating was brittle and cracks were formed in the secondary resin layer. In the optical fiber of Sample No. 2-9, the in situ elastic modulus of the secondary resin layer was less than 1200 MPa, so that the lateral pressure resistance characteristics were insufficient and the transmission loss increased. In the optical fiber of Sample No. 2-11, the in situ elastic modulus of the primary resin layer was less than 0.1 MPa, so that the lateral pressure resistance characteristics were insufficient and the transmission loss increased, voids occurred, and the transmission loss increased in low temperatures.

Third Embodiment

Although illustration is omitted, an optical fiber according to a third embodiment is different from optical fiber 10A according to the first embodiment in that secondary resin layer 15 is a colored resin layer including a pigment or a dye. The optical fiber according to the third embodiment has a smaller diameter than optical fiber 10C according to the second embodiment since there is no coating layer 17 (see FIG. 8).

The optical fiber according to the third embodiment is used, for example, when forming a cable without forming into a tape.

Variation of Third Embodiment

Although illustration is omitted, an optical fiber according to a variation of the third embodiment includes glass fiber 13B (see FIG. 6) instead of glass fiber 13A (see FIG. 8). The structure and characteristics of glass fiber 13B are similar to those of the variation of the first embodiment.

Third Example

Hereinafter, the results of evaluation tests performed using Experimental Examples and Comparative Examples according to the third embodiment, and Experimental Examples and Comparative Examples according to the variation of the third embodiment are shown. It should be noted that the present invention is not limited to these Examples.

A plurality of samples of the optical fiber were produced similarly to the First Example, except for the secondary resin layer being formed of a colored resin layer. Table 6 shows the various factors of the optical fiber similarly to Table 1. The measurement method and evaluation criteria for the maximum value of amplitude of the amount of eccentricity, the in situ elastic modulus, and the lateral pressure resistance characteristics, and the measurement method and evaluation criteria for the screening tension are similar to those of the First Example.

TABLE 6

| Sample No. | | 3-1 | 3-2 | 3-3 | 3-4 | 3-5 | 3-6 | 3-7 | 3-8 | 3-9 | 3-10 | 3-11 | 3-12 |
|---|---|---|---|---|---|---|---|---|---|---|---|---|---|
| Outer | Glass | 80 | 80 | 80 | 80 | 80 | 80 | 80 | 80 | 80 | 80 | 80 | 80 |
| diameter | Primary | 155 | 135 | 155 | 90 | 120 | 105 | 110 | 120 | 120 | 120 | 120 | 120 |
| [μm] | Secondary | 170 | 170 | 170 | 130 | 130 | 140 | 150 | 160 | 170 | 170 | 160 | 160 |
| In situ | Primary | 0.4 | 0.3 | 0.1 | 0.2 | 0.3 | 0.3 | 0.3 | 0.3 | 0.3 | 0.6 | 0.02 | 0.3 |
| elastic modulus [MPa] | Secondary | 1200 | 1200 | 1200 | 2800 | 2000 | 2000 | 2000 | 2800 | 3000 | 2800 | 2000 | 1000 |
| Thickness [μm] | Coating resin | 45 | 45 | 45 | 25 | 25 | 30 | 35 | 40 | 45 | 45 | 40 | 40 |
| | Primary | 37.5 | 27.5 | 37.5 | 5 | 20 | 12.5 | 15 | 20 | 20 | 20 | 20 | 20 |
| | Secondary | 7.5 | 17.5 | 7.5 | 20 | 5 | 17.5 | 20 | 20 | 25 | 25 | 20 | 20 |

TABLE 6-continued

| Sample No. | 3-1 | 3-2 | 3-3 | 3-4 | 3-5 | 3-6 | 3-7 | 3-8 | 3-9 | 3-10 | 3-11 | 3-12 |
|---|---|---|---|---|---|---|---|---|---|---|---|---|
| Maximum value of amplitude of amount of eccentricity [μm] | 3 | 5 | 3 | 6 | 6 | 2 | 1 | 7 | 8 | 8 | 0 | 12 |
| Coating clearance [μm] | 42 | 40 | 42 | 19 | 19 | 28 | 34 | 33 | 37 | 37 | 40 | 31 |
| G.657 categories | A2 | A2 | A2 | B3 | B3 | B2 | A2 | A2 | A2 | A2 | A2 | A2 |
| Lateral pressure resistance characteristics | A | A | A | A | A | A | A | A | A | C | A | C |
| Void resistance | A | A | A | A | A | A | A | A | A | A | B | A |
| Breakage frequency | A | A | A | A | A | A | A | A | A | A | A | B |
| External appearance | A | A | A | A | A | A | A | A | B | A | A | A |

The optical fibers of Sample Nos. 3-1 to 3-8 are Examples of the optical fiber according to the variation of the third embodiment, and the optical fibers of Sample Nos. 3-9 to 3-12 are Comparative Examples of the optical fiber according to the variation of the third embodiment. The optical fibers of Sample Nos. 3-1 to 3-12 use a glass fiber having a structure similar to that of glass fiber 13B.

The optical fibers of Sample Nos. 3-1 to 3-8 have an in situ elastic modulus of the primary resin layer of 0.4 MPa or less, and are thus void resistant specialized optical fibers. The optical fibers of Sample Nos. 3-2 to 3-8 have an in situ elastic modulus of the primary resin layer of 0.3 MPa or less, and are thus micro-bending resistant specialized optical fibers.

According to the Examples and Comparative Examples, each evaluation is rated A, when the outer diameter of the glass fiber is 80 μm, the thickness of the primary resin layer is from 5 μm to 37.5 μm, the thickness of the secondary resin layer is from 5 μm to 20 μm, the outer diameter of the secondary resin layer is from 130 μm to 170 μm, the in situ elastic modulus of the primary resin layer is from 0.1 MPA to 0.4 MPa, the in situ elastic modulus of the secondary resin layer is from 1200 MPa to 2800 MPa, and the maximum value of amplitude of the amount of eccentricity of the glass fiber is 10 μm or less, so that an optical fiber which has a reduced diameter and is capable of suppressing deterioration of the lateral pressure resistance characteristics and void resistance (low-temperature characteristics) can be provided. In this optical fiber, the deterioration of external appearance and the breakage frequency are also suppressed.

The breakage frequency increased in the optical fibers of Sample Nos. 3-8 to 3-10 and 3-12 since the maximum value of amplitude of the amount of eccentricity was over 10 μm due to the fact that no vibration control parts were used in the production. The optical fiber of Sample No. 3-9 had a defective external appearance since the in situ elastic modulus of the secondary resin layer was over 2800 MPa, so that the coating was brittle and cracks were formed in the secondary resin layer. In the optical fiber of Sample No. 3-10, the in situ elastic modulus of the primary resin layer was over 0.5 MPa, so that the lateral pressure resistance characteristics were insufficient and the transmission loss increased. In the optical fiber of Sample No. 3-12, the in situ elastic modulus of the secondary resin layer was less than 1200 MPa, so that the lateral pressure resistance characteristics were insufficient and the transmission loss increased. In the optical fiber of Sample No. 3-11, the in situ elastic modulus of the primary resin layer was less than 0.1 MPa, so that the lateral pressure resistance characteristics were insufficient and the transmission loss increased, voids occurred, and the transmission loss increased in low temperatures.

Fourth Embodiment

Although illustration is omitted, an optical fiber according to a fourth embodiment is different from optical fiber 10C according to the second embodiment in that secondary resin layer 15 is a colored resin layer including a pigment or a dye, and coating layer 17 is a transparent resin layer (clear coating layer). The optical fiber according to the fourth embodiment is different from the optical fiber according to the third embodiment in that the optical fiber according to the fourth embodiment further includes coating layer 17 which is a transparent resin layer. The optical fiber according to the fourth embodiment is used, for example, when forming into a tape.

Variation of Fourth Embodiment

Although illustration is omitted, an optical fiber according to a variation of the fourth embodiment includes glass fiber 13B (see FIG. 6) instead of glass fiber 13A (see FIG. 8). The structure and characteristics of glass fiber 13B are similar to those of the variation of the first embodiment.

Fourth Example

Hereinafter, the results of evaluation tests performed using Experimental Examples and Comparative Examples according to the fourth embodiment, and Experimental Examples and Comparative Examples according to the variation of the fourth embodiment are shown. It should be noted that the present invention is not limited to these Examples.

A plurality of samples of the optical fiber were produced similarly to the Second Example, except for the secondary resin layer being formed of a colored resin layer and the coating layer being a transparent resin layer. Table 7 shows the various factors of the optical fiber similarly to Table 5. The measurement method and evaluation criteria for the maximum value of amplitude of the amount of eccentricity, the in situ elastic modulus, and the lateral pressure resistance characteristics, and the measurement method and evaluation criteria for the screening tension are similar to those of the Second Example.

TABLE 7

| Sample No. | | 4-1 | 4-2 | 4-3 | 4-4 | 4-5 | 4-6 | 4-7 | 4-8 | 4-9 | 4-10 | 4-11 | 4-12 |
|---|---|---|---|---|---|---|---|---|---|---|---|---|---|
| Outer diameter [μm] | Glass | 80 | 80 | 80 | 80 | 80 | 80 | 80 | 80 | 80 | 80 | 80 | 80 |
| | Primary | 150 | 150 | 150 | 90 | 110 | 105 | 110 | 120 | 150 | 150 | 120 | 120 |
| | Secondary | 160 | 160 | 160 | 120 | 120 | 130 | 140 | 150 | 160 | 160 | 150 | 150 |
| | Coating | 170 | 170 | 170 | 130 | 130 | 140 | 150 | 160 | 170 | 170 | 160 | 160 |
| In situ elastic modulus [MPa] | Primary | 0.1 | 0.2 | 0.3 | 0.1 | 0.1 | 0.3 | 0.3 | 0.3 | 0.1 | 0.1 | 0.02 | 0.1 |
| | Secondary | 1200 | 2000 | 2500 | 1200 | 2800 | 2800 | 2500 | 2000 | 1000 | 3000 | 2000 | 2000 |
| Thickness [μm] | Coating resin | 45 | 45 | 45 | 25 | 25 | 30 | 35 | 40 | 45 | 45 | 40 | 40 |
| | Primary | 35 | 35 | 35 | 5 | 15 | 12.5 | 15 | 20 | 35 | 35 | 20 | 20 |
| | Secondary | 5 | 5 | 5 | 15 | 5 | 12.5 | 15 | 15 | 5 | 5 | 15 | 15 |
| | Coating | 5 | 5 | 5 | 5 | 5 | 5 | 5 | 5 | 5 | 5 | 5 | 5 |
| Maximum value of amplitude of amount of eccentricity [μm] | | 4 | 3 | 5 | 6 | 3 | 5 | 3 | 2 | 5 | 1 | 0 | 12 |
| Coating clearance [μm] | | 41 | 42 | 40 | 19 | 22 | 25 | 32 | 38 | 40 | 44 | 40 | 32 |
| G.657 categories | | A2 | A2 | A2 | B3 | B3 | B2 | A2 | A1 | A2 | A1 | A2 | A2 |
| Lateral pressure resistance characteristics | | A | A | A | B | B | B | A | A | C | A | A | A |
| Void resistance | | A | A | A | A | A | A | A | A | A | A | B | A |
| Breakage frequency | | A | A | A | A | A | A | A | A | A | A | A | B |
| External appearance | | A | A | A | A | A | A | A | A | A | B | A | A |

The optical fiber of Sample No. 4-8 is an Example of the optical fiber according to the fourth embodiment, and the optical fiber of Sample No. 4-10 is Comparative Examples of the optical fiber according to the fourth embodiment. That is, the optical fibers of Sample Nos. 4-8, and 4-10 use a glass fiber having a structure similar to that of glass fiber 13A. The optical fibers of Sample Nos. 4-1 to 4-7 are Examples of the optical fiber according to the variation of the fourth embodiment, and the optical fibers of Sample Nos. 4-9, 4-11, and 4-12 are Comparative Examples of the optical fiber according to the variation of the fourth embodiment. That is, the optical fibers of Sample Nos. 4-1 to 4-7, 4-9, 4-11, and 4-12 use a glass fiber having a structure similar to that of glass fiber 13B, and satisfy the level of bending loss specified in ITU-T G.657.A2, B2, and B3.

The optical fibers of Sample Nos. 4-1 to 4-8 have an in situ elastic modulus of the primary resin layer of 0.4 MPa or less, and are thus void resistant specialized optical fibers. The optical fibers of Sample Nos. 4-1 to 4-8 have an in situ elastic modulus of the primary resin layer of 0.3 MPa or less, and are thus micro-bending resistant specialized optical fibers.

According to the Examples and Comparative Examples, the lateral pressure resistance characteristics are rated A or B, the void resistance is rated A, the breakage frequency is rated A, the breakage probability is rated A, and the external appearance is rated A, when the outer diameter of the glass fiber is 80 μm, the thickness of the primary resin layer is from 5 μm to 35 μm, the thickness of the secondary resin layer is from 5 μm to 15 μm, the thickness of the coating layer is 5 μm, the outer diameter of the secondary resin layer is from 120 μm to 160 μm, the in situ elastic modulus of the primary resin layer is from 0.1 MPA to 0.5 MPa, the in situ elastic modulus of the secondary resin layer is from 1200 MPa to 2800 MPa, and the maximum value of amplitude of the amount of eccentricity of the glass fiber is 10 μm or less, so that an optical fiber which has a reduced diameter and is capable of suppressing deterioration of the lateral pressure resistance characteristics and void resistance (low-temperature characteristics) can be provided. In this optical fiber, the deterioration of external appearance and the breakage frequency are also suppressed.

The breakage frequency increased in the optical fiber of Sample No. 4-12 since the maximum value of amplitude of the amount of eccentricity was over 10 μm due to the fact that no vibration control parts were used in the production. The optical fiber of Sample No. 4-10 had a defective external appearance since the in situ elastic modulus of the secondary resin layer was over 2800 MPa, so that the coating was brittle and cracks were formed in the secondary resin layer. In the optical fiber of Sample No. 4-9, the in situ elastic modulus of the secondary resin layer was less than 1200 MPa, so that the lateral pressure resistance characteristics were insufficient and the transmission loss increased. In the optical fiber of Sample No. 4-11, the in situ elastic modulus of the primary resin layer was less than 0.1 MPa, so that the lateral pressure resistance characteristics were insufficient and the transmission loss increased, voids occurred, and the transmission loss increased in low temperatures.

Fifth Embodiment

Figure 9:
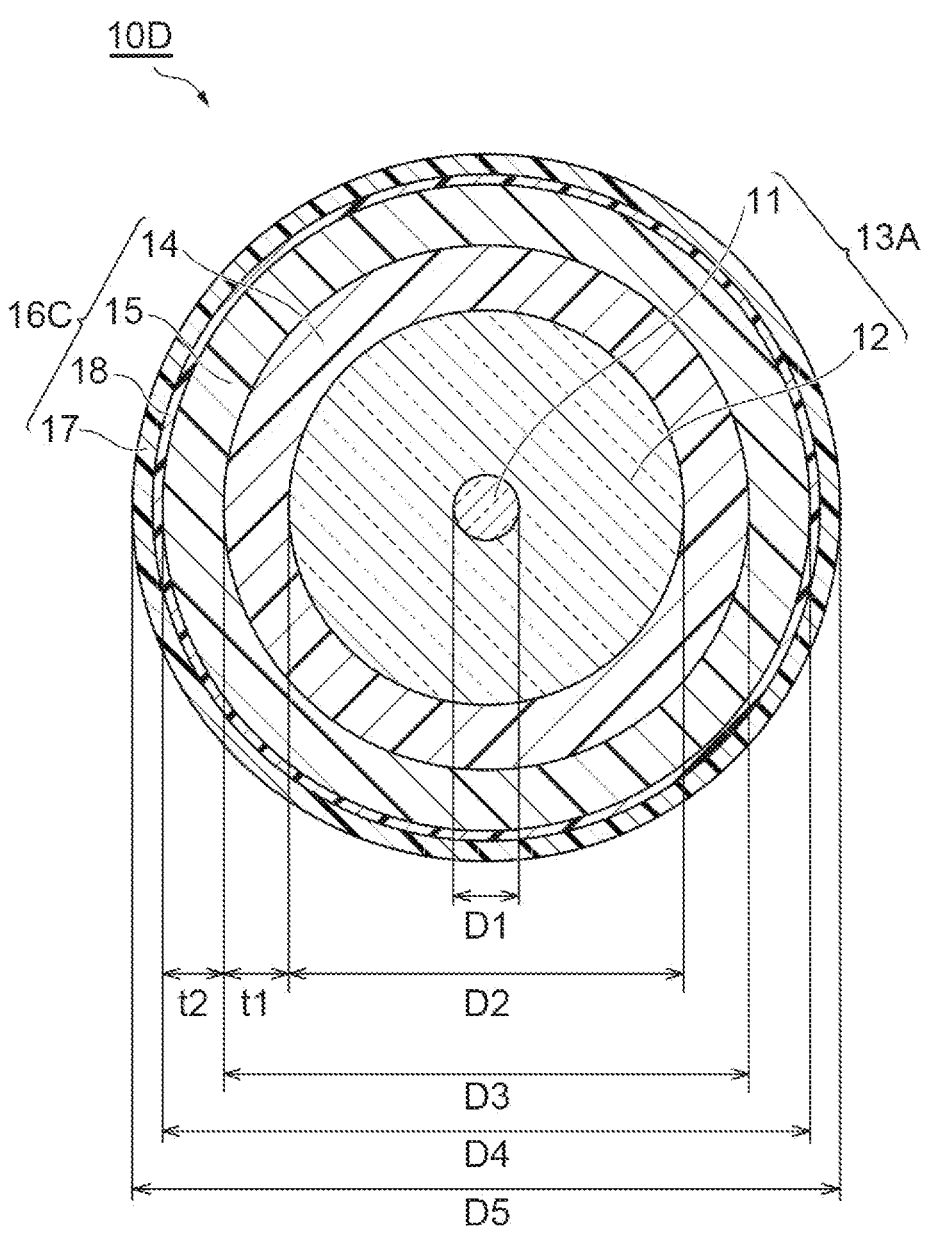
FIG. 9 is a diagram illustrating a cross-section perpendicular to an axial direction of an optical fiber according to a fifth embodiment.

FIG. 9 is a diagram illustrating a cross-section perpendicular to an axial direction of an optical fiber 10D according to a fifth embodiment. Optical fiber 10D is different from optical fiber 10C of the second embodiment in that it includes a coating resin layer 16C instead of coating resin layer 16B. In optical fiber 10D, secondary resin layer 15 is a transparent or semitransparent resin layer similarly to optical fiber 10C, and coating layer 17 is a colored resin layer. Coating resin layer 16C further has a ring mark 18 in addition to the configuration of coating resin layer 16B. Ring mark 18 is disposed between secondary resin layer 15 and coating layer 17.

Ring mark 18 is a resin layer of a color different from that of coating layer 17. Ring marks 18 are formed spaced from each other in the axial direction of glass fiber 13A. Ring marks 18 are formed, for example, by an ink jet method in which a solvent borne ink is injected. Since a solvent borne ink can be removed by wiping with alcohol or the like, ring marks 18 are formed on the outer surface of secondary resin layer 15, and coating layer 17 is formed thereon to cover the ring marks 18. Ring marks 18 are layers having a discontinuous thickness in a length direction of the optical fiber. There are places where there are no ring marks 18 when optical fiber 10D is viewed along the length direction.

According to this variation, the number of distinguishable colors of the optical fiber core wire can be increased by the number of combinations of the number of colors of coating layer 17 and the number of colors of ring marks 18. The number of distinguishable colors of the optical fiber core wire can thus be significantly increased. In optical fiber 10D, secondary resin layer 15 may be a colored resin layer, and coating layer 17 may be a transparent resin layer. Even in this case, the number of distinguishable colors of the optical fiber core wire can be increased by the number of combinations of the number of colors of secondary resin layer 15 and the number of colors of ring marks 18 by causing the color of ring marks 18 to be different from the colors of secondary resin layer 15.

Although the embodiments and variations have been described, the present disclosure is not necessarily limited to the embodiments and variations described above, and various modifications are possible without departing from the gist thereof. The embodiments and variations above may be combined as appropriate.

What is claimed is:

1. An optical fiber comprising:

a glass fiber including a core and a cladding; and a coating resin layer coating an outer periphery of the glass fiber, wherein the coating resin layer includes:

a primary resin layer coating the outer periphery of the glass fiber; and a secondary resin layer coating an outer periphery of the primary resin layer, the glass fiber has an outer diameter of from 79 μm to 81 μm, the primary resin layer has a thickness of 5 μm or more, the secondary resin layer has a thickness of 5 μm or more, the secondary resin layer has an outer diameter of from 120 μm to 170 μm, the primary resin layer has an in situ elastic modulus of from 0.1 MPa to 0.4 MPa, the secondary resin layer has an in situ elastic modulus of from 1200 MPa to 2800 MPa, and a maximum value of amplitude of an amount of eccentricity is 10 μm or less in a spectrum obtained by measuring, at a plurality of measurement points set at predetermined intervals in an axial direction of the glass fiber, the amount of eccentricity of the glass fiber from a central axis relative to the outer periphery of the secondary resin layer, the amount of eccentricity being measured based on a position of an outer periphery of the coating resin layer and a position of the outer periphery of the glass fiber that are obtained from an image of light penetrated through the optical fiber and by applying Fourier transform to a waveform representing the amount of eccentricity at each position of the plurality of measurement points, a wavelength at which the amplitude of the amount of eccentricity is largest is 0.1 m or more.

2. The optical fiber according to claim 1, wherein the secondary resin layer is a colored layer including a pigment or a dye.

3. The optical fiber according to claim 1, wherein the primary resin layer has an in situ elastic modulus of from 0.1 MPa to 0.3 MPa.

4. The optical fiber according to claim 1, wherein when, after screening at a tension of 0.7 kg, a transmission loss at a wavelength of 1550 nm is measured in a bundle at 23° C. and −40° C., a transmission loss difference is 0.5 dB/km or less.

5. The optical fiber according to claim 1, wherein the cladding includes: an inner cladding covering an outer periphery of the core; a trench covering an outer periphery of the inner cladding; and an outer cladding covering an outer periphery of the trench, the inner cladding has a refractive index lower than a refractive index of the core, the trench has a refractive index lower than the refractive index of the inner cladding, and the outer cladding has a refractive index higher than the refractive index of the trench and lower than the refractive index of the core.

6. The optical fiber according to claim 5, conforming to at least one of ITU-T G.657.A2, G.657.B2, and G.657.B3.

7. The optical fiber according to claim 5, having a mode field diameter at 1310 nm of from 7.0 μm to 8.6 μm.

8. An optical fiber comprising:

a glass fiber including a core and a cladding; and a coating resin layer coating an outer periphery of the glass fiber, wherein the coating resin layer includes:

a primary resin layer coating the outer periphery of the glass fiber;

a secondary resin layer coating an outer periphery of the primary resin layer; and a coating layer coating an outer periphery of the secondary resin layer, the glass fiber has an outer diameter of from 79 μm to 81 μm, the secondary resin layer has an outer diameter of from 120 μm to 160 μm, the coating layer has an outer diameter of from 130 μm to 170 μm, the primary resin layer has a thickness of 5 μm or more, the secondary resin layer has a thickness of 5 μm or more, the primary resin layer has an in situ elastic modulus of from 0.1 MPa to 0.5 MPa, the secondary resin layer has an in situ elastic modulus of from 1200 MPa to 2800 MPa, and a maximum value of amplitude of an amount of eccentricity is 10 μm or less in a spectrum obtained by measuring, at a plurality of measurement points set at predetermined intervals in an axial direction of the glass fiber, the amount of eccentricity of the glass fiber from a central axis relative to the outer periphery of the secondary resin layer, the amount of eccentricity being measured based on a position of an outer periphery of the coating resin layer and a position of the outer periphery of the glass fiber that are obtained from an image of light penetrated through the optical fiber and by applying Fourier transform to a waveform representing the amount of eccentricity at each position of the plurality of measurement points, a wavelength at which the amplitude of the amount of eccentricity is largest is 0.1 m or more.

9. The optical fiber according to claim 8, wherein the coating layer is a colored resin layer including a pigment or a dye.

10. The optical fiber according to claim 8, wherein the secondary resin layer is a colored resin layer including a pigment or a dye, and the coating layer is a transparent resin layer.

11. The optical fiber according to claim 8, wherein the coating layer includes a mold release agent.

12. The optical fiber according to claim 8, wherein the coating resin layer further has a ring mark disposed between the secondary resin layer and the coating layer.

13. The optical fiber according to claim 8, wherein the primary resin layer has an in situ elastic modulus of from 0.1 MPa to 0.3 MPa.

\* \* \* \* \*